Feb. 14, 1928.
S. C. CLINKSCALE
PLANT DIGGER
Filed July 15, 1926
1,659,241
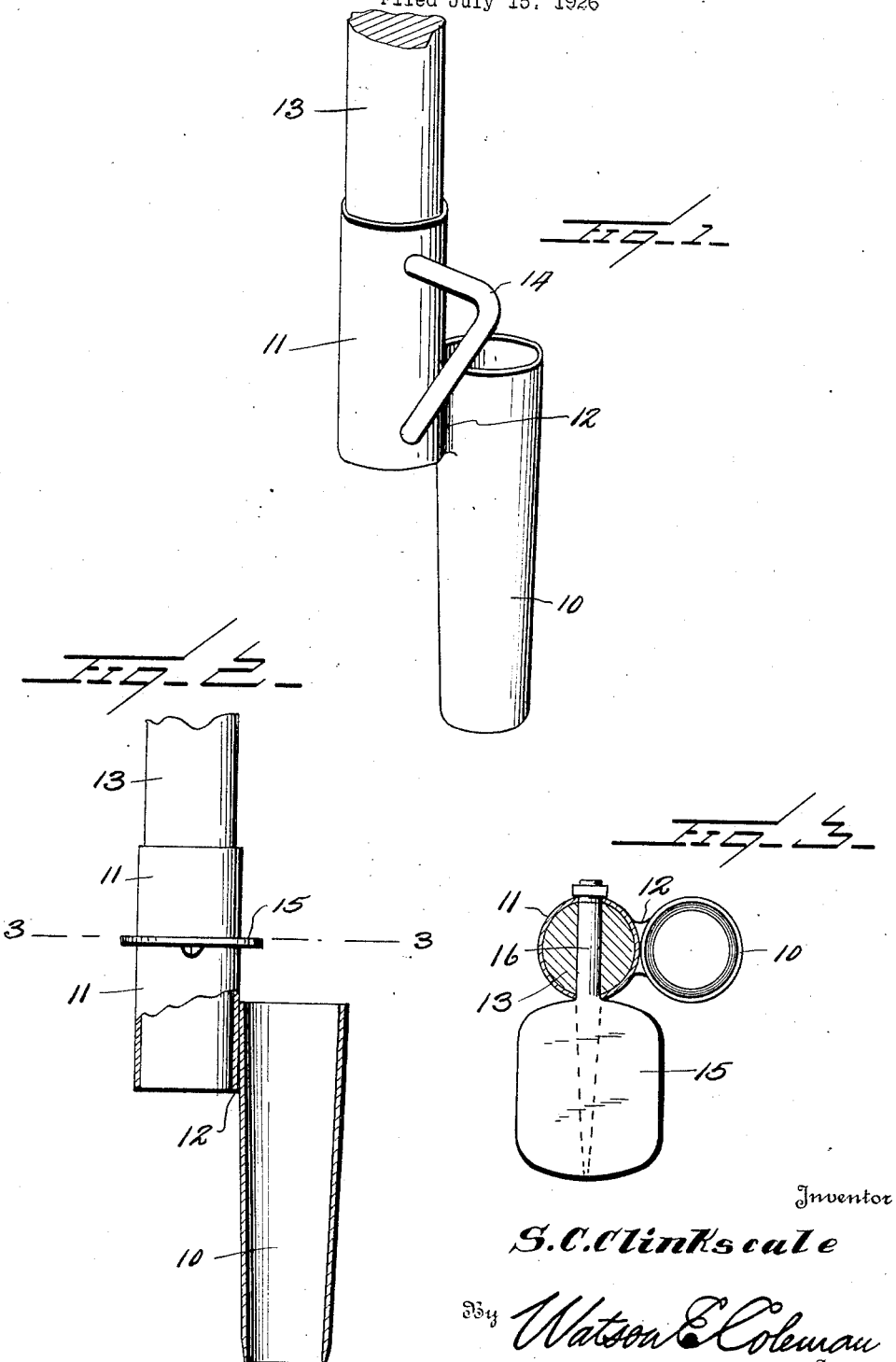
Inventor
S. C. Clinkscale
By Watson E. Coleman
Attorney Patented Feb. 14, 1928.

1,659,241

UNITED STATES PATENT OFFICE.

SAMUEL C. CLINKSCALE, OF BONITA, KANSAS.

PLANT DIGGER.

Application filed July 15, 1926. Serial No. 122,672.

This invention relates to certain improvements in the plant digger described and claimed in my Patent No. 1,475,686, granted November 27, 1923, and the general object of the present invention is to provide a foot piece mounted upon the handle socket of the digger whereby the digger may be forced into the ground.

My invention is illustrated in the accompanying drawings wherein:—

Figure 1 is a perspective view of a plant digger constructed in accordance with my invention;

Fig. 2 is an elevation partly in section showing a modification of the structure shown in Figure 1;

Fig. 3 is a section on the line 3—3 of Figure 2.

Referring to these drawings 10 designates a tubular body such as is illustrated in my prior patent, this body being tapered and having a sharpened lower end whereby it may be forced into the ground around a weed or around a plant so that when this tubular body is raised it will lift the wheel or plant with it. Attached to this tubular body in any suitable manner and overlapping the upper end of the same to some extent is a handle socket 11. This is connected to the body 10 at the point 12 and inserted into the upper end of the handle socket is a handle 13 of any desired length and character.

Attached to the handle socket by brazing, riveting, welding, or the like, is a foot piece 14, shown in Figure 1 as formed of a relatively heavy rod bent to provide a horizontal portion at its upper end and an inwardly and downwardly inclined portion. The foot is adapted to be placed upon the horizontal portion so as to force the digger into the ground.

In Figure 2 I have illustrated another form of foot piece comprising a plate-like member 15 having a shank 16 adapted to be inserted through the socket 11 and through the handle, thus acting to hold the handle in place within the socket. This plate 15 is preferably ribbed upon its under face so as to increase its strength.

The use of this device is the same as in my prior patent. The digger is forced into the ground by the operator placing his foot upon the foot piece 14 or 15 and when the digger is raised it will lift the plant with it. Thus the digger may be readily used for weeding lawns and the like as well as for other purposes.

While I have illustrated the foot pieces 14 and 15 as being disposed to extend through the socket 11 and the handle, it is to be understood that these foot pieces might extend through any other portion of the digger as, for instance, through the web 12 connecting the tubular body 10 and the socket 11.

I claim:—

A plant digger of the character described, comprising a tubular downwardly tapering member having a sharpened lower edge, a socket having offset relation to the tubular member and overlapping the upper end thereof and rigidly connected thereto, a footpiece rigidly engaged with the socket and projecting laterally therefrom at right angles to the tubular member and a handle inserted in the handle socket, the foot piece having a shank portion extending through the socket and through the handle and thereby holding the handle in engagement with the socket.

In testimony whereof I hereunto affix my signature.

SAMUEL C. CLINKSCALE.